(12) United States Patent
Badger, II (10) Patent No.: US 9,842,447 B2
(45) Date of Patent: Dec. 12, 2017

(54) SYSTEM AND METHOD FOR RANGE-BOOSTED KEY FOB

(71) Applicant: Ford Global Technologies, LLC, Dearborn, MI (US)

(72) Inventor: Charles Everett Badger, II, Garden City, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 19 days.

(21) Appl. No.: 14/871,466

(22) Filed: Sep. 30, 2015

(65) Prior Publication Data

US 2017/0092030 A1    Mar. 30, 2017

(51) Int. Cl.
*G07C 9/00* (2006.01)
*B60R 25/102* (2013.01)

(52) U.S. Cl.
CPC ........ *G07C 9/00309* (2013.01); *B60R 25/102* (2013.01); *G07C 9/00571* (2013.01); *G07C 2009/00984* (2013.01); *G07C 2209/62* (2013.01); *G07C 2209/63* (2013.01)

(58) Field of Classification Search
CPC ...... G07C 9/00309; G07C 2009/00984; G07C 2009/00793; G07C 9/00571; G07C 2209/62; G07C 2209/63; G06F 17/00; B60R 2325/205; B60R 25/24; B60R 25/102; H04B 1/3816; H04L 63/0853; G06Q 20/18
USPC ....................................................... 340/5.61
See application file for complete search history.

(56) References Cited

U.S. PATENT DOCUMENTS

| | | | |
|---|---|---|---|
| 8,751,065 B1 | 6/2014 | Kato | |
| 8,847,731 B2 | 9/2014 | Tieman | |
| 9,002,536 B2 | 4/2015 | Hatton | |
| 9,230,440 B1* | 1/2016 | Penilla | G08G 1/145 |
| 2011/0257817 A1 | 10/2011 | Tieman | |
| 2014/0176301 A1* | 6/2014 | Fernandez Banares | G07C 9/00015 340/5.26 |
| 2014/0274013 A1* | 9/2014 | Santavicca | H04W 4/008 455/418 |

(Continued)

FOREIGN PATENT DOCUMENTS

| | | |
|---|---|---|
| DE | 102008039156 A1 | 2/2010 |
| DE | 102013105022 A1 | 11/2014 |

(Continued)

OTHER PUBLICATIONS

Sean J., Remote Access Makes Your Smartphone a Virtual Keyfob, Ford Social, https://social.ford.com/our-articles/cuvs/edge/remote-access-makes-your-smartphone-a-virtual-keyfob/.

(Continued)

*Primary Examiner* — Ali Neyzari
(74) *Attorney, Agent, or Firm* — James P. Muraff; Neal, Gerber & Eisenberg LLP (57) ABSTRACT

A vehicle key fob is provided having a module for wirelessly communicating with an associated mobile device, a dedicated input device for initiating a mobile link mode, a plurality of input devices for commanding an associated vehicle to perform a user-selected function, and a processor configured to, upon receiving an input at the dedicated input device, send a command signal for performing the user-selected function to the mobile device.

19 Claims, 4 Drawing Sheets

(56) References Cited

U.S. PATENT DOCUMENTS

| | | | |
|---|---|---|---|
| 2014/0277837 A1 | 9/2014 | Hatton | |
| 2014/0340196 A1 | 11/2014 | Myers et al. | |
| 2016/0049033 A1* | 2/2016 | Sigal | B60R 25/24 340/5.61 |
| 2016/0325710 A1* | 11/2016 | Honkanen | B60R 25/2081 |

FOREIGN PATENT DOCUMENTS

| | | | |
|---|---|---|---|
| DE | 102014019123 A1 | 6/2016 | |
| EP | 1216899 A1 | 6/2002 | |
| EP | 1216900 A1 | 6/2002 | |
| EP | 2048627 A2 | 4/2009 | |
| WO | WO 2015/153950 A1 | 10/2015 | |

OTHER PUBLICATIONS

Delphi's New Key Fob Technology Helps Make Smart Phone Connectivity Available at Low Cost, Delphi Media Room—Media Releases, Apr. 13, 2010, http://www.nav200.delphi.com/about/news/media/pressReleases/2010/pr_2010_04_13_004/.

Search Report for GB1616482.4 dated Dec. 21, 2016, 5 pages.

Search Report dated Jul. 11, 2017 for GB Patent Application No. GB 1616482.4 (3 Pages).

\* cited by examiner

SYSTEM AND METHOD FOR RANGE-BOOSTED KEY FOB

TECHNICAL FIELD

This application generally relates to remote keyless control of vehicle functions and more specifically, to electronic key fob apparatuses for controlling functions in an automobile or other vehicle.

BACKGROUND

Many vehicles include a remote keyless system (RKS) for enabling access to the vehicle, or control of vehicle functions, without using a traditional key or other mechanical device, or otherwise making physical contact with the vehicle. Typically, remote keyless systems include a remote control comprising buttons or switches for enabling control of vehicle functions. The remote control may be in the form of an independent key fob separate from an ignition key of the vehicle, or a key fob built into the ignition key handle.

Conventional remote keyless systems typically include a remote keyless entry (RKE) system for enabling remote, keyless control of the vehicle's doors, including, for example, locking and unlocking the door locks or other electronic locks in the vehicle, opening and/or closing the trunk, tailgate, sliding doors, or other electronically-operated doors. Typically, the key fob includes a lock button for locking all vehicle doors and an unlock button for unlocking one or more of the vehicle doors. In some cases, the key fob also includes a button for releasing the trunk or tailgate. Many existing RKE systems are designed to enable control of additional vehicle functions through entry of a predetermined button sequence. For example, pressing the unlock button once may unlock only the driver's side door, while pressing the unlock button twice may unlock all vehicle doors.

In some cases, the RKE system also enables opening and/or closing of the vehicle's windows and/or roof (e.g., moonroof, sunroof, convertible top, etc.). For example, the windows and/or roof may be opened via entry of a predetermined button sequence on the key fob (e.g., holding the unlock button for a predetermined time period). In other cases, the windows and/or roof may be automatically closed whenever the vehicle doors are locked using the key fob. Conventional remote keyless systems can also include a remote keyless ignition (RKI) system for enabling remote, keyless start of the vehicle's engine. In such cases, the key fob includes an ignition button for starting the engine. In addition, remote keyless systems typically include a red panic button for activating the vehicle's alarm system.

One drawback of existing remote keyless systems is the limited operational range of the key fob or other remote control. Specifically, the key fob must be within a predetermined distance (e.g., 200 meters) of the vehicle in order to issue commands using the remote keyless system. Moreover, the actual, operational range of the key fob may be less than the predetermined distance due to various factors, including location, elevation, intermediate structures, and blocking obstacles. In cases where the operational range of the key fob is less than a user's current distance from the vehicle, the user must move closer in order to use the key fob. The user may also need to move closer to the vehicle in order to receive confirmation that a requested action has been completed. For example, the vehicle may blink its headlights and/or sound its horn to confirm completion of a lock command, but the user will not receive this confirmation if the vehicle is not within a visible and/or audible range.

One existing solution for extending the communication range of commercially-available key fob systems includes a smartphone-enabled vehicle connectivity platform that uses Bluetooth or Near Field Communications (NFC) technology to create a gateway between the vehicle and a smartphone, or other mobile device. This platform turns the mobile device into a virtual key fob that allows users to control various vehicle features through a graphical user interface (GDD) presented on the mobile device, rather than inputting similar commands into the physical key fob or using the ignition key. However, as is the case with many mobile applications, inputting a command using the GUI can require several steps (i.e. icon selections), in addition to selecting the intended command. For example, the user may need to turn on, activate, and/or unlock the mobile device, open the appropriate application, and log into a customer account before being presented with the GUI for entering vehicle commands. By contrast, the key fob includes dedicated buttons for quick, intuitive entry of vehicle commands (e.g., a lock button for locking doors, an unlock button for unlocking one or more doors, etc.).

Accordingly, there is still a need in the art for a vehicle key fob apparatus that has a wider communication range and allows quick and convenient entry of vehicle commands.

SUMMARY

The invention is intended to solve the above-noted and other problems by providing systems and methods for extending a communication range of a vehicle key fob that, among other things, (1) provides a range-boosted transmission path that sends user-inputted vehicle commands from the key fob to a mobile device paired to the key fob, the mobile device sending the command to a server that transmits the command to the vehicle associated with the key fob, and (2) provides a dedicated button on the vehicle key fob for initiating said range-boosted transmission path. For example, one embodiment provides a vehicle key fob having a module for wirelessly communicating with an associated mobile device, a dedicated input device for initiating a mobile link mode, a plurality of input devices for commanding an associated vehicle to perform a user-selected function, and a processor configured to, upon receiving an input at the dedicated input device, send a command signal for performing the user-selected function to the mobile device.

As will be appreciated, this disclosure is defined by the appended claims. The description summarizes aspects of the embodiments and should not be used to limit the claims. Other implementations are contemplated in accordance with the techniques described herein, as will be apparent to one having ordinary skill in the art upon examination of the following drawings and detail description, and such implementations are intended to within the scope of this application.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects.

Figure 1:
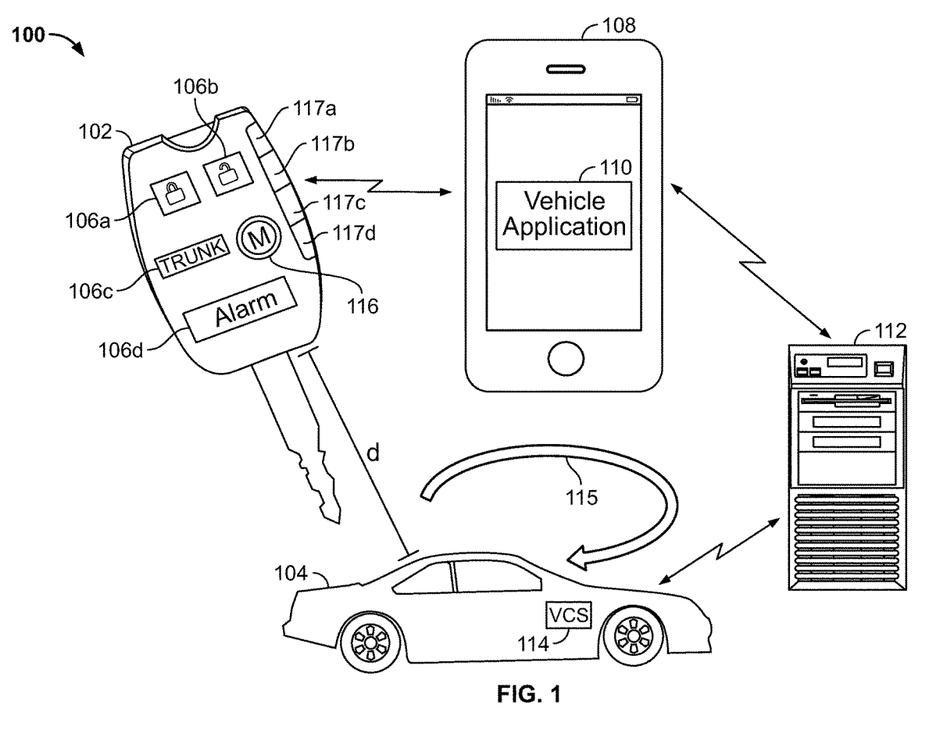
FIG. 1 is an illustration of an example wireless system for extending a communication range of a vehicle key fob, in accordance with certain embodiments.
Figure 2:
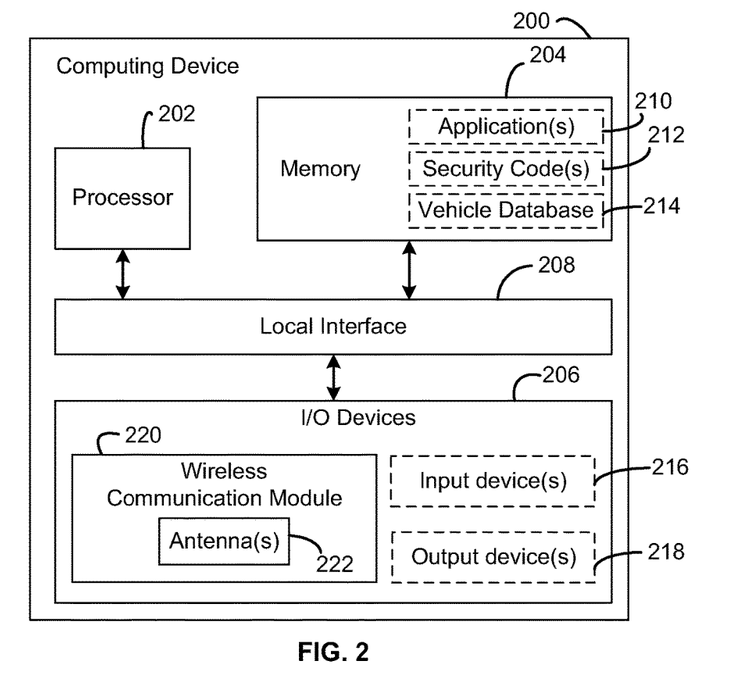
FIG. 2 is a block diagram of an example computing device included in one or more components of the wireless system of FIG. 1, in accordance with certain embodiments.
Figure 3:
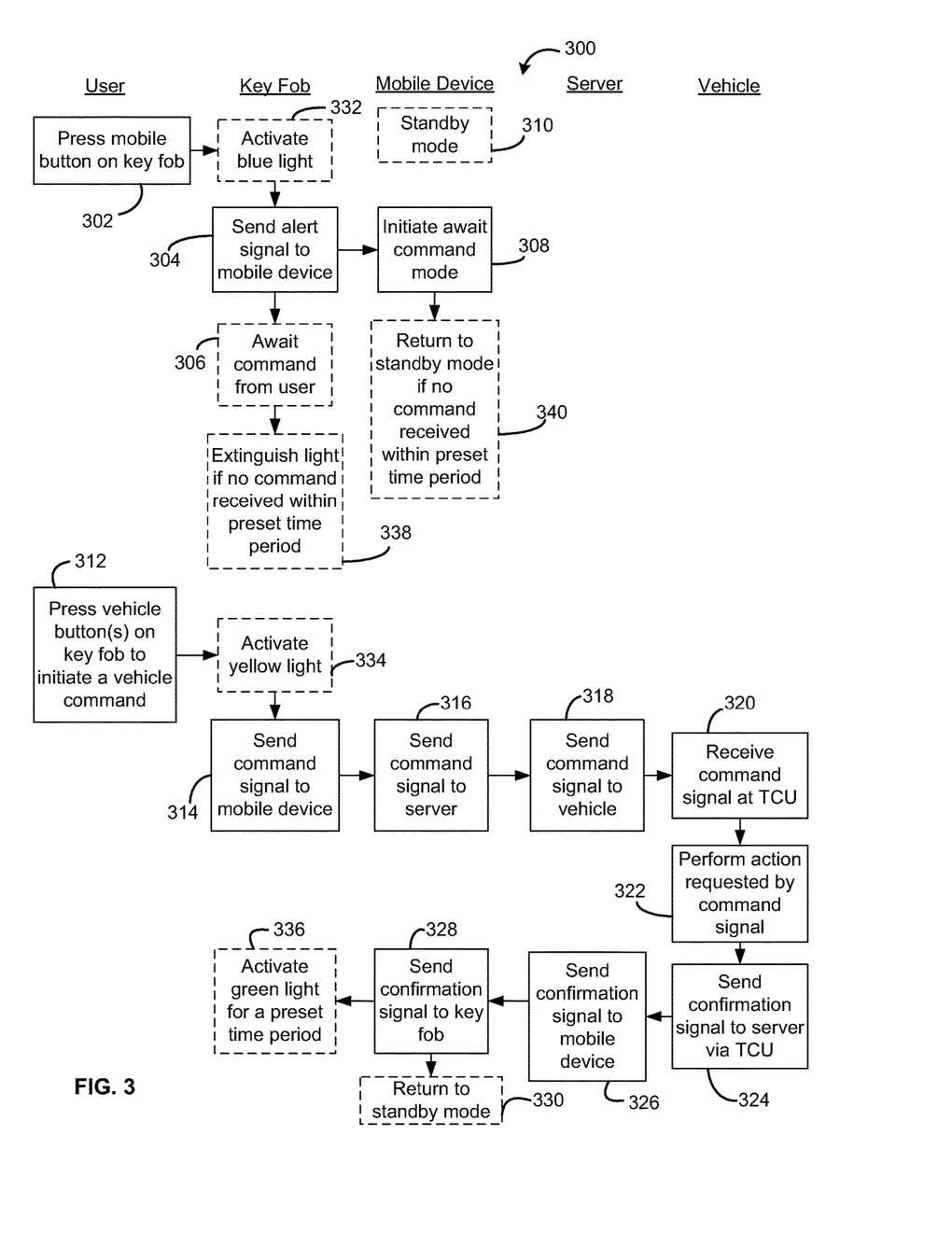
FIG. 3 is a flowchart including example operations that may be implemented using the system of FIG. 1, in accordance with certain embodiments.

FIG. 1 illustrates an example wireless system 100 configured to extend an operational range of a key fob apparatus 102 for controlling various operations or functions of a vehicle 104 that is associated with the key fob apparatus 102, in accordance with embodiments. Various components of the system 100 may be implemented using software executable by one or more servers or computers, such as a computing device 200 with a processor 202 and a memory 204 as shown in FIG. 2, which is described in more detail below. For example, an embodiment of a process 300 for extending a communication range of a vehicle key fob apparatus is shown in FIG. 3, in accordance with one or more principles of the invention. The process 300 may be implemented using the system 100, or more specifically, through interactions between various components of the system 100 that are facilitated by software executing on one or more computer processors (not shown) associated with said components. In the following paragraphs, the process 300 will be described in conjunction with a description of the various components of the system 100.

The vehicle key fob apparatus 102 (also referred to herein as a "key fob") is configured to provide a user with remote, keyless control of various operations or functions of the vehicle 104, including, but not limited to, locking and unlocking door locks or other electronic locks of the vehicle 104, opening and/or closing a trunk, tailgate, sliding door, or other electronically-operated door of the vehicle 104, opening and/or closing a window or roof of the vehicle 104, starting an engine of the vehicle 104, and/or activating an alarm system of the vehicle 104. The key fob apparatus 102 may be pre-configured to enable direct control of these operations of the vehicle 104 by the vehicle manufacturer or an entity associated therewith. As will be appreciated, other vehicle functions may be controllable by the key fob 102, and the present disclosure is intended to cover any and all such key fob operations.

As shown in FIG. 1, the key fob 102 includes a plurality of vehicle input devices 106 (also referred to herein as "vehicle buttons") that can be operated by the user to convey operational commands to the vehicle 104. In embodiments, each vehicle input device 106 can be associated with at least one vehicle function. For example, in the illustrated embodiment, the vehicle input devices 106 includes a door lock input device 106a for locking all vehicle doors, a door unlock input device 106b for unlocking one or more of the vehicle doors, a trunk release input device 106c for releasing the trunk or tailgate, and a panic input device 106d for activating the vehicle alarm system. The vehicle input devices 106 can be any type of input device, including, but not limited to, buttons or push buttons, sliders, switches, knobs, dials, and/or touch input devices. In the illustrated embodiment, the vehicle input devices 106 are push buttons that can be selectively pressed by the user to activate performance of the vehicle function(s) associated therewith.

In embodiments, at least some vehicle functions are performed upon receiving a single user input at the vehicle input device 106 for controlling said vehicle function, while other vehicle functions may be performed upon receiving a certain sequence or combination of inputs at one or more of the vehicle input devices 106. These combinational inputs can include, for example, sequential operation of two or more vehicle input devices 106 and/or repeated operation of a single vehicle input device 106, such as, e.g., double-clicking the input device 106 or holding down the input device 106 for a preset time period. As an example, the trunk release input device 106c may need to be double-clicked or held down in order to release the trunk. As another example, a single click of the unlock input device 106b may unlock only the driver's side door, while a double-click of the unlock input device 106b may unlock all of the vehicle doors.

As shown in FIG. 1, the wireless system 100 further includes a mobile device 108 that is paired to the key fob 102 using known wireless pairing techniques, including, for example, exchanging security codes stored in a memory (not shown) of the key fob 102 with the mobile device 108 for authentication by the vehicle 104. The mobile device 108 may communicate with the key fob 102 using Bluetooth, infrared, radio frequency identification (RFID), near field communication (NFC), or any other short-range wireless communication technology. The mobile device 108 may be any type of portable electronic device, including, for example, a smartphone or other mobile telephone, a tablet or tablet-type personal computer, a personal digital assistant (PDA), a smartwatch or other wearable device, and the like.

In some embodiments, the mobile device 108 includes a software application 110 that is configured to at least communicate vehicle commands received from the key fob 102 to a remote server 112. The software application 110 (also referred to here as a "vehicle application") can be a mobile client that is developed by, and/or associated with, the vehicle manufacturer, and can be customized for the vehicle 104. In some cases, the vehicle application 110 is specifically designed for pairing the key fob 102 to the mobile device 108 and for boosting a communication range of the key fob 102, as described below in more detail. In other cases, the vehicle application 110 also provides a graphical user interface for accessing a remote keyless system (RKS) of the vehicle 104. In still other cases, the vehicle application 110 additionally provides diagnostic and/or performance information about the vehicle 104. In embodiments, all or a portion of the vehicle application 110 can be stored in a memory (not shown) of the mobile device 108.

As shown in FIG. 1, the remote server 112 can be communicatively coupled to the mobile device 108 and a vehicle computing system (VCS) 114 of the vehicle 104 via a wireless communication network, such as, for example, a WiFi network or other wireless Ethernet, cellular network, and/or satellite. In embodiments, the remote server 112 can be a cloud computing device, or can be included in a cloud computing network, both of which may be controlled by, and/or associated with, the vehicle manufacturer. In some embodiments, a secure, wireless communication channel may be pre-established between the VCS 114 and the remote server 112 in order to enable direct communication between the vehicle 104 and the server 112 without the need for pairing or authorization before each key fob operation. The secure communication channel may be established by, or under the supervision of, the vehicle manufacturer.

The remote server 112 can include a vehicle database (not shown) for storing vehicle information received from the VCS 114 of the vehicle 104, as well as other information associated with the vehicle 104, including, for example, global positioning system (GPS) data for the vehicle 104 received from a GPS server, a charging profile for the vehicle 104, a key profile for each key associated with the vehicle 104, fuel economy and driving habits associated with each key, etc. In some embodiments, a portion of the vehicle application 110 resides on the remote server 112. In some embodiments, the remote server 112 supplies images and/or information for implementing the vehicle application 110 on the mobile device 108. The remote server 112 can also store one or more software applications designed for interacting with the vehicle application 110 and the VCS 114, including receiving commands from the vehicle application 110 and submitting the same to the VCS 114, as will be explained in more detail below.

During normal operation, the key fob 102 must be within a predetermined distance d of the vehicle 104 in order to wirelessly communicate commands to the vehicle 104. For example, in some cases, the predetermined, or manufacturer-provided, distance d may be about 200 meters. As will be appreciated, the distance d can be adversely affected by geographical, physical, and/or other various factors, including, for example, the existence of solid obstacles between the key fob 102 and the vehicle 104. In such cases, the actual, operational range of the key fob 102 can be less than the predetermined distance d. Further, in some cases, the operational range of the key fob 102 can be shorter than a user's distance from the vehicle 104. To address these and other concerns, the wireless system 100 is configured to extend the operational range of the key fob 102 beyond the predetermined distance d by providing a range-boosted transmission path 115 (also referred to herein as the "extended transmission path") that sends vehicle commands from the key fob 102 to the vehicle 104 via the mobile device 108 and the remote server 112.

More specifically, as shown in FIG. 1, the key fob 102 includes a mobile link input device 116 that is configured to initiate the extended transmission path 115 between the key fob 102 and the vehicle 104, or a mobile link mode of the system 100. In embodiments, the mobile link input device 116 is a dedicated input device for alerting the mobile device 108 to expect a vehicle command from the key fob 102. In some cases, the mobile link input device 116 can be located on the key fob 102 adjacent to the vehicle input devices 106, as shown in FIG. 1. In other cases, the mobile link input device 116 can be located on any other side of the key fob 102, including, for example, on a left, right, or back side of the key fob 102. In the illustrated embodiment, the mobile link input device 116 (also referred to herein as a "mobile button") is shown as a push button that can be pressed down to activate the mobile link mode of the key fob 102. In other embodiments, the mobile link input device 116 can be any other type of input device, including, but not limited to, a switch, knob, slider, or dial.

In some embodiments, the key fob 102 further includes a biometric security device (not shown) for authenticating the biometric identification of the user before activating the mobile link or otherwise initiating the extended transmission path 115. For example, the biometric security device may include a fingerprint scanning device and a memory for storing one or more authorized fingerprints for comparison to a fingerprint scan. The biometric security device may be integrated into the mobile link input device 116 or embedded in another location of the key fob 102.

Referring now to FIG. 3 and the process 300, upon user-selection of the mobile button 116 at step 302, the key fob 102 sends an alert signal to the mobile device 108 at step 304 and, at step 306, may await further command(s) from the user. At step 308, upon receipt of the alert signal, the mobile device 108, and/or the vehicle application 110, enters an await command mode, or otherwise waits for the key fob 102 to send a signal commanding the vehicle 104 to perform a specified operation. Prior to receiving the alert signal, the mobile device 108 may have been in a standby mode, as shown by step 310. The await command mode can cause the mobile device 108 and/or the vehicle application 110 to automatically transmit, to the remote server 112, any vehicle command received from the key fob 102 within a predetermined time period following selection of the mobile button 116.

As shown in FIG. 3, a vehicle command may be input into the key fob 102 at step 312 upon user-selection of one or more vehicle buttons 106. At step 314, the key fob 102 sends a command signal corresponding to the received vehicle command to the mobile device 108. At step 316, the mobile device 108, and/or the vehicle application 110, sends the command signal to the remote server 112. At step 318, the remote server 112 sends the received command signal to the VCS 114 of the vehicle 104. At step 320, a telematics control unit (TCU) of the VCS 114 receives the command signal, and at step 322, an appropriate unit of the VCS 114 performs the action requested by the command signal or otherwise carries out the command, thus completing the extended transmission path 115. Upon completion of the command, the TCU of the vehicle 104 sends a confirmation signal to the remote server 112 at step 324. At step 326, the remote server 112 forwards the confirmation signal to the mobile device 108, which in turn, sends the confirmation signal to the key fob 102, at step 328, and returns to standby mode, at step 330.

As shown in FIG. 1, the key fob 102 further includes one or more output devices 117 for providing a visual, audible, and/or haptic output in response to certain inputs received by the key fob 102, and for indicating a current stage or step of the process 300. For example, a first output may be provided upon receiving a user-selection of the mobile button 116 at the key fob 102 (e.g., step 302). A second output may be provided upon receiving a user selection of the one or more vehicle input devices 106 at the key fob 102 (e.g., step 312) and while the corresponding vehicle command is being sent to, and performed by, the vehicle 104 (e.g., steps 314-322). And a third output may be provided upon receiving confirmation from the vehicle 104 that the vehicle command has been performed (e.g., steps 324-328).

In some embodiments, the one or more output devices 117 can be configured to provide a different visual output, or cue, depending on the input received at the key fob 102. In such cases, the output devices 117 can include light emitting diodes (LEDs), each LED configured to output a different colored light to respectively represent a different input. For example, in the illustrated embodiment, the key fob 102 includes a first output device 117*a* that emits a first colored light (e.g., blue) in response to user-selection of the mobile button 116 (at step 332), a second output device 117*b* that emits a second colored light (e.g., yellow) in response to user entry of a vehicle command via at least one vehicle input device 106 (at step 334), and a third output device 117*c* that emits a third colored light (e.g., green) upon receiving confirmation that the vehicle command has been performed (at step 336). As shown in FIG. 1, the key fob 102 can further include a fourth output device 117*d* that emits a fourth colored light (e.g., red) upon receiving a non-performance signal indicating that the vehicle command could not be performed and/or the vehicle command could not be sent to the mobile device 108.

In some cases, the third and fourth colored lights may remain activated for only a present time period, for example, in order to save power. Also, in some cases, the second colored light may remain activated until the confirmation signal or non-performance signal is received from the mobile device 108. To indicate that the wireless system 100 is processing the user's command, the second colored light may flash, or blink on and off, until the confirmation or non-performance signal is received.

In some embodiments, the process 300 is further configured to include a time out feature in case a vehicle command is not entered after receiving user selection of the mobile button 116. In such cases, at step 338, the key fob 102 extinguishes the first colored light on the key fob 102 if no command is received via the key fob 102 within a preset time period. Likewise, at step 340, the mobile device 108 returns to standby mode if no command is received within a preset time period.

In other embodiments, the one or more output devices 117 includes at least one haptic device (not shown), such as an actuator or electro-mechanical motor, that vibrates, buzzes, or otherwise provides a haptic cue, or output, in response to inputs received at the key fob 102. In some cases, the key fob 102 can include a single haptic device that outputs a different type of haptic cue, or combination of haptic cues, for each type of input. For example, the haptic device may output a single buzz, two or more buzzes in quick succession, two or more buzzes in delayed succession, or any other combination of haptic cues. In one embodiment, the one or more output devices 117 includes at least one LED and at least one haptic device and, for each input received at the key fob 102, the output devices 117 can be configured to output at least one haptic cue, at least one visual cue, or a combination of the two.

In one embodiment, one or more of the output devices 117 on the key fob 102 may be activated in response to an alarm signal output by the vehicle 104, for example, in response to a triggering of an alarm system of the vehicle 104 or other alarm at the vehicle 104. In such cases, the vehicle 104 can be configured to send the alarm signal to the key fob 102 via a reverse of the extended transmission path 115. More specifically, the vehicle 104 may send the alarm signal to the server 112, which may send the alarm signal to the mobile device 108, and the mobile device 108 may transmit the alarm signal to the key fob 102 for activation of one or more of the output device(s) 117. The output device(s) 117 may provide light and/or haptic outputs to warn the user of the triggered alarm.

Figure 4:
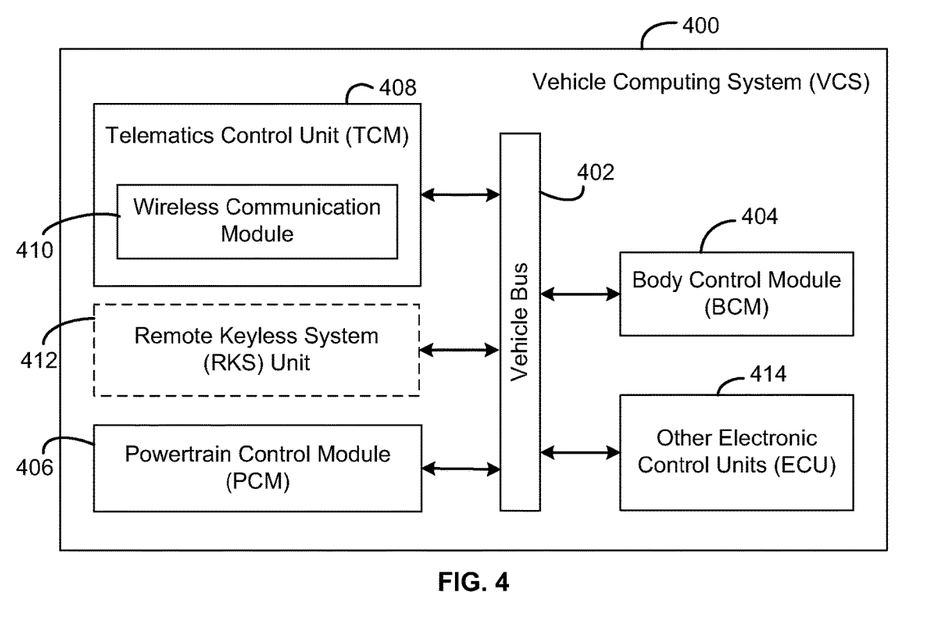
FIG. 4 is a block diagram of an example vehicle computing system included in the vehicle of FIG. 1, in accordance with certain embodiments.

Referring now to FIG. 4, shown is an example vehicle computing system (VCS) 400 that may be included in the vehicle 104 as the VCS 114 shown in FIG. 1, in accordance with embodiments. The VCS 400 includes various electronic control units (ECUs) that are responsible for monitoring and controlling the electrical systems or subsystems of the vehicle 104, as described in more detail below. In embodiments, the ECUs of the VCS 400 are interconnected by a vehicle bus 402 (such as, e.g., a controller area network (CAN) bus) for passing data to and from the various ECUs, as well as other vehicle and/or auxiliary components in communication with the VCS 400. Each ECU may include, for example, one or more inputs and outputs for gathering, receiving, and/or transmitting data, a memory for storing the data, and a processor for processing the data and/or generating new information based thereon.

In the illustrated embodiment, the VCS 400 includes a body control module (BCM) 404 for controlling and monitoring various electronic accessories in a body of the vehicle 104. In embodiments, the BCM 404 is an ECU that controls the doors of the vehicle 104, including locking, unlocking, opening, and/or closing said doors. In some embodiments, the BCM 404 also controls the power windows, power roof (e.g., moonroof, sunroof, convertible top, etc.), and interior lighting of the vehicle 104. The BCM 404 may also control other electronically-powered components in the body of the vehicle 104, such as, for example, air-conditioning units, power mirrors, and power seats. In cases where the BCM 404 only controls and monitors the doors of the vehicle 104, the BCM 404 may be referred to as the door control unit (DCU), as will be appreciated. The BCM 404 can be configured to implement vehicle commands received from the key fob 102 that are related to the doors, windows, or other body components controlled by the BCM 404.

As shown in FIG. 4, the VCS 400 can further include a powertrain control module (PCM) 406 for controlling and monitoring the engine and transmission of the vehicle 104. In some embodiments, the PCM 406 can be separated into two separate ECUs, specifically an engine control unit and a transmission control unit. In either case, the PCM 406 can be configured to control starting and stopping of the engine of the vehicle 104, including receiving commands to start the engine from the key fob 102.

As shown in FIG. 4, the VCS 400 further includes a telematics control unit (TCU) 408, which is an ECU for enabling the vehicle 104 to connect to various wireless networks, including, for example, GPS, WiFi, cellular, Bluetooth, NFC, RFID, satellite, and/or infrared. In embodiments, the TCU 408 (also referred to as a "vehicle telematics unit") includes a wireless communication module 410 comprising one or more antennas, radios, modems, receivers, and/or transmitters (not shown) for connecting to the various wireless networks. For example, the wireless communication module 410 can include a mobile communication unit (not shown) for wirelessly communicating over a cellular network (e.g., GSM, GPRS, LTE, 3G, 4G, CDMA, etc.), an 802.11 network (e.g., WiFi), a WiMax network, and/or a satellite network. The TCU 408 can also be configured to control tracking of the vehicle 104 using latitude and longitude values obtained from a GPS satellite.

In embodiments, the TCU 408 receives external data, including vehicle commands, via the wireless communication module 410 and provides the external data to an appropriate ECU of the VCS 400. For example, if the TCU 408 receives a lock door command, the TCU 408 sends the command to the BCM 404 via the vehicle bus 402. Likewise, if the TCU 408 receives a start engine command, the TCU 408 sends the command to the PCM 406 via the vehicle bus 402. In some embodiments, the TCU 408 also receives internal data from other ECUs of the VCS 400, or a processor (not shown) of the VCS 400, with instructions to transmit the internal data to the remote server 112, or another component of the wireless system 100.

The wireless communication module 410 can be capable of wirelessly communicating over two or more networks to ensure continuity of network access, for example, in case one of the networks fail or are out of range. Moreover, the vehicle commands may be received at different receivers of the wireless communication module 410 depending on the wireless communication technology being used to transmit the command. For example, commands and/or data transmitted by the key fob 102 to the vehicle 104 may be received at a Bluetooth receiver (not shown) of the wireless communication module 410. As another example, commands and/or data transmitted by the remote server 112 to the vehicle 104 may be received at a cellular or WiFi receiver (not shown) of the wireless communication module 410. Likewise, data may be transmitted from the TCU 408 to the key fob 102 using a Bluetooth transmitter (not shown) included in the wireless communication module 410, and data may be transmitted from the TCU 408 to the remote server 112 using a cellular or WiFi transmitter (not shown) included in the wireless communication module 410. In embodiments, the VCS 400 may be transparent to the source of, or the transmission path used to send, the vehicle command to the vehicle 104. For example, the VCS 400 may treat vehicle commands received directly from the key fob 102 no differently than vehicle commands received via the transmission path 115.

The VCS 400 can further include a remote keyless system (RKS) unit 412 for controlling and monitoring remote, keyless interactions between the key fob 102 and the vehicle 104. The RKS unit 412 can include a remote keyless entry system and in some cases, a remote keyless ignition system. In the latter case, the RKS unit 412 may also be referred to as a "passive entry passive start (PEPS) system." In some embodiments, the RKS unit 412 is a separate, stand-alone ECU that is interconnected to the BCM 404, PCM 406, TCU 408, and other ECUs 414 of the vehicle 104 via the vehicle bus 402 in order to carry out the RKS/PEPS operations. For example, the RKS unit 412 may receive vehicle commands from the key fob 102 via the TCU 408, process the commands to identify the appropriate ECU for carrying out the command, send the command to the identified ECU, and confirm performance of the command. In other embodiments, the RKS unit 412 may be comprised of multiple segments that are incorporated into various ECUs of the VCS 400, such as, for example, the BCM 404, the PCM 406, and/or the TCU 408, to process the RKS/PEPS commands received at each ECU. In still other embodiments, the RKS unit 412 may be included within one ECU, such as, e.g., the TCU 408, in order to handle or process RKS/PEPS commands as they are received by the wireless communication module 410 of the TCU 408.

Figure 5:
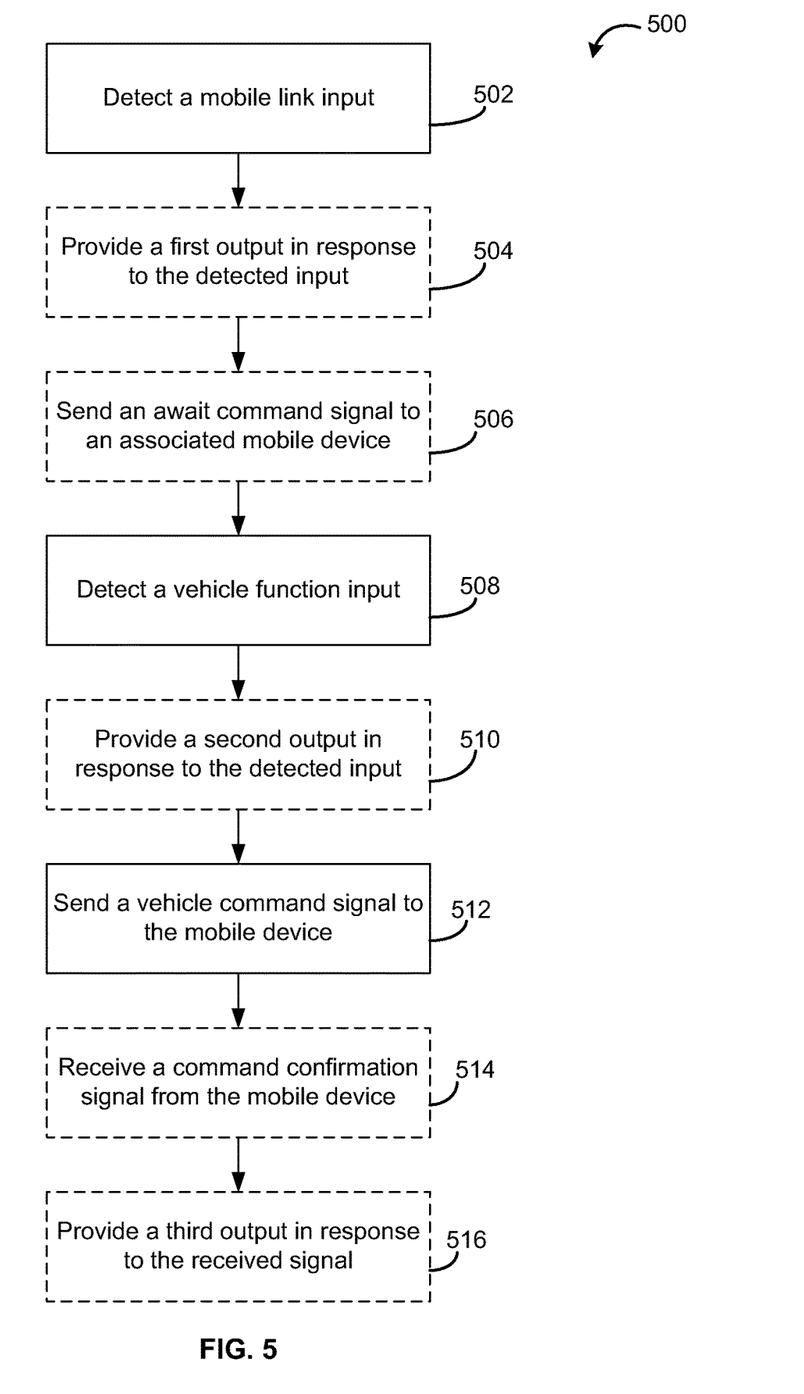
FIG. 5 is a flow diagram of an example method for extending a communication range of a vehicle key fob, in accordance with certain embodiments.

FIG. 5 illustrates an example method 500 for extending a communication range of a vehicle key fob apparatus, in accordance with embodiments. The method 500 can be carried out by the vehicle key fob apparatus, such as, for example, the key fob 102 of the wireless system 100. Further, the vehicle key fob apparatus may interact with one or more components of the system 100 to carry out the operations of the method 500. As shown in FIG. 5, the method 500 begins at step 502, where the key fob detects a mobile link input. In embodiments, the mobile link input may be entered by the user pressing a mobile link input device on the key fob, such as, for example, the mobile link button 116 shown in FIG. 1. In some embodiments, the method 500 further includes, at step 504, providing a first output via the key fob in response to detecting the mobile link input at step 502. The first output may be a visual, audible, and/or haptic cue provided by an output device of the key fob to indicate receipt of the mobile link input to the user of the key fob. In one embodiment, the first output is a first colored light emitted upon activating the output device 117a (e.g., a blue LED) of the key fob 102, as shown in FIG. 1. In some cases, the method 500 further includes de-activating the first output once a preset time-out period has passed without receiving any further command through the input devices of the key fob.

In some embodiments, in response to detecting the mobile link input, the method 500 includes, at step 504, sending an await command signal to a mobile device associated with the key fob, such as, for example, the mobile device 108 shown in FIG. 1. Upon receiving the await command signal (also referred to therein as "an alert signal"), the mobile device may enter a corresponding await command mode, or otherwise prepare to receive a vehicle command from the key fob.

At step 508, the key fob detects a vehicle function input at one or more vehicle command input devices included on the key fob, such as, for example, the vehicle input devices 106 shown in FIG. 1. The vehicle function input includes a command for the vehicle to perform a desired operation or function, such as, for example, lock the vehicle doors, release the trunk, start the engine, or other normal key fob operation. In some embodiments, upon receiving the vehicle function input, the key fob provides a second output at step 510. The second output may be a visual, audible, and/or haptic cue provided by an output device of the key fob to indicate receipt of the vehicle function input to the user of the key fob. In one embodiment, the second output is a second colored light emitted upon activating the output device 117b (e.g., a yellow LED) of the key fob 102, as shown in FIG. 1.

At step 512, the key fob sends a vehicle command signal to the mobile device associated with the key fob for relay to the vehicle. The key fob then waits for confirmation that the vehicle command has been performed by the vehicle. The vehicle command signal includes the command associated with the vehicle function input entered by the user. For example, if the user pressed the lock button 106a of the key fob 102, the vehicle command signal includes a command to lock the vehicle doors. As another example, if the user pressed the unlock button 106b of the key fob 102 twice, the vehicle command signal includes a command to unlock all of the vehicle doors.

In some embodiments, the method 500 further includes, at step 514, receiving, at the key fob, a positive response (e.g., a command confirmation signal) from the mobile device indicating that the vehicle command has been performed. The command confirmation signal may be provided to the mobile device by a remote server that is communicatively coupled to the vehicle, and the vehicle may be configured to provide the command confirmation signal to the remote server upon determining that the user-selected vehicle command has been completed at the vehicle. In one embodiment, the remote server (such as, e.g., the remote server 112)

has a pre-established, secure communication channel with a telematics control unit (TCU) of the vehicle (such as, e.g., the TCU 408 of the vehicle 104) to enable delivery of vehicle commands to the vehicle.

In some embodiments, the method 500 further includes, at step 516, providing a third output at the key fob in response to receiving the positive response. The third output may be a visual, audible, and/or haptic cue provided by an output device of the key fob to acknowledge receipt and completion of the vehicle command to the user of the key fob. In one embodiment, the third output is a third colored light emitted upon activating the output device 117c (e.g., a green LED) of the key fob 102, as shown in FIG. 1.

In some embodiments, the method 500 also includes providing a fourth output (e.g., a red light) in response to receiving a negative response (e.g., a non-performance signal) from the mobile device, for example, if the requested vehicle command could not be completed or the command signal could not be sent through the transmission path 115. In some cases, the second output may be a flashing or blinking light (e.g., the yellow LED may be successively turned on and off) to indicate that the vehicle command has been sent to the mobile device and that the key fob is awaiting a response. The second output may continue to be provided while the wireless system 100 processes the command and until the key fob receives either the confirmation signal or the non-performance signal from the mobile device.

Referring back to FIG. 2, shown is an example computing device 200 for processing data or other inputs associated with the wireless system 100, for housing and executing software used to facilitate the wireless system 100, the process 300, and/or the method 500, and/or for communicating with other components of the wireless system 100, in accordance with embodiments. One or more instances of the computing device 200 may be utilized to implement any, some, or all of the components in the system 100. In some embodiments, portions of the system 100 are implemented in software, as an executable program, and are executed by one or more special or general purpose digital computer(s), such as a mainframe computer, personal computer (desktop, laptop, or tablet-type computer), personal digital assistant, workstation, minicomputer, computer network, virtual network, Internet cloud computing facility, mobile telephone or smartphone, tablet, or other handheld computing device. In such cases, the computing device 200 may be representative of any computer in which the system 100 resides or partially resides.

As an example, the computing device 200 may represent a computer included in the key fob 102 for receiving vehicle command inputs and communicate with the vehicle 104 and/or the mobile device 108. Likewise, the computing device 200 may represent a computer included in the mobile device 108 for storing, executing, and displaying the vehicle application 110, and communicating with the key fob 102 and the remote server 112. As another example, the computing device 200 may represent a computer included in the remote server 112 for interfacing with the mobile device 108 and communicating vehicle commands to the vehicle 104. Further, the computing device 200 may represent a computer included in the VCS 114 of the vehicle 104 for communicating with the key fob 102 and the remote server 112, as well as receiving, processing, and executing vehicle commands received therefrom.

As shown in FIG. 2, the computing device 200 generally includes a processor 202, a memory 204, and one or more input and/or output (I/O) devices 206 (or peripherals) that are communicatively coupled via a local interface 208. The processor 202 is a hardware device and can be any custom made or commercially available processor, a central processing unit (CPU), an auxiliary processor among several processors associated with the computer 200, a semiconductor based microprocessor (in the form of a microchip or chip set), another type of microprocessor, or generally any device for executing software instructions. When the computing device 200 is in operation, the processor 202 can be configured to execute software stored within the memory 204, to communicate data to and from the memory 204, and to generally control operations of the computing device 200 pursuant to the software. The software, in whole or in part, but typically the latter, may be read by the processor 202, buffered within the processor 202, and then executed.

The memory 204 may include a computer readable medium for storing software for implementing the system 100, and/or components thereof, and for implementing particular system transactions. For example, the memory 204 may be configured to store one or more separate programs (e.g., source program, executable program (object code), or script) comprising ordered listings of executable instructions for implementing logical functions associated with the system 100. Furthermore, the software can be written as (a) an object oriented programming language, which has classes of data and methods, or (b) a procedural programming language, which has routines, subroutines, and/or functions, for example but not limited to, C, C++, C#, Pascal, Basic, Fortran, Cobol, Perl, Java, Ada, Python, and Lua. Components of the system 100 may also be written in a proprietary language developed to interact with these known languages. In the context of this document, a "computer-readable medium" may be any means that can store, communicate, propagate, or transport data objects for use by or in connection with the wireless system 100, and can even include paper having programming instructions printed thereon.

In some cases, the software in the memory 204 includes one or more applications 210 that are associated with the wireless system 100 and configured to implement the transmission path 115. As an example, in the memory 204 of the mobile device 108, the application(s) 210 can include all or a portion of the vehicle application 110. As another example, in the memory 204 of the key fob 102, the application(s) 210 include a mobile link application for implementing the method 500, or otherwise detect user-selection of the mobile link button 116 and send vehicle commands received thereafter to the mobile device 108. In some cases, the memory 204 of the key fob 102 can also store one or more security codes 212 that are uniquely associated with the vehicle 104 and enable the key fob 102 to remotely command certain vehicle operations. In yet another example, in the memory 204 of the server 112, the application(s) 210 include software designed to interface with the mobile device 108 and provide received vehicle commands to the telematics control unit (TCU) 408, or the VCS 114/400, of the vehicle 104. The memory 204 of the server 112 can also be utilized to implement one or more databases, such as, for example, a vehicle database 214 configured to store information associated with the vehicle 104, including for example, diagnostic information received from the TCU 408, GPS information received from a GPS satellite and associated with the vehicle 104, user account information related to the vehicle application 110, and the like.

In embodiments, the memory 204 includes any one or a combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 204 may incorporate electronic, magnetic, optical, and/or other types of storage media. In some cases, the memory 204 can have a distributed architecture where various components are situated remote from one another, but are still accessed by the processor 202.

The local interface 208 may be, for example, but is not limited to, one or more buses or other wired or wireless connections, as is known in the art. The local interface 208 may have additional elements, which are omitted for simplicity, such as controllers, buffers (caches), drivers, repeaters, and receivers, to enable communications. Further, the local interface 208 may include address, control, and/or data connections to enable appropriate communications among the other computer components.

The I/O devices 206 may include interactive hardware that is internal to the computing device 200, or external and connected wirelessly or via connection cable and/or I/O ports. The I/O devices 206 can include input devices 216, for example but not limited to, input modules for programmable logic controllers (PLCs), a keyboard, mouse, scanner, microphone, touchscreens, stylus, radio-frequency device readers, input hardware (e.g., buttons, switches, sliders, knobs, dials, and the like; such as, for example, the vehicle input devices 106 and the mobile input device 116), etc. Furthermore, the I/O devices 206 may also include output devices 218, for example but not limited to, output modules for PLCs, displays, haptic devices (e.g., actuators), lights (e.g., LEDs; such as, for example, the output devices 117), audio output devices (e.g., speakers), etc.

The I/O devices 206 further comprise devices that communicate with both inputs and outputs, including, but not limited to, a wireless communication module 220. The wireless communication module 220 includes one or more antennas 222 configured to wireless transmit signals to, and/or receive signals from, at least other components of the wireless system 100. The wireless communication module 220 further includes one or more receivers, transmitters, and/or transceivers (not shown) that are communicatively coupled to the one or more antennas 222 for processing the received signals, providing the transmitted signals, or otherwise facilitating wireless communication with other components of the wireless system 100. The wireless communication module 220 may also include a modulator/demodulator (modem; for accessing another device, system, or network, such as, e.g., another component within the wireless system 100), a bridge, and/or a router.

The exact type of wireless communication technology included in the wireless communication module 220 can vary depending on the computing device 200 and may include at least one of short-range wireless communication technology (such as, e.g., radio frequency (RF), Bluetooth, infrared, and/or NFC technology) and longer-range or broadband wireless communication technology (such as, e.g., WiFi, WiMax, other wireless Ethernet, cellular, GPS, and/or satellite technology). In some cases, the wireless communication module 220 may include more than one antenna and corresponding transceiver in order to communicate over different wireless networks. For example, the mobile device 102 may use Bluetooth technology to communicate with the key fob 102 and WiFi and/or cellular technology to communicate with the remote server 112.

In some cases, the computing device 200 can also include hardware for implementing one or more aspects of the techniques described herein. In such cases, the hardware utilizes any of the following technologies, or a combination thereof, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Thus, the systems and methods described herein can establish an extended communication range between a vehicle key fob apparatus and the vehicle associated therewith by relaying vehicle commands entered into the key fob through a transmission path that includes a mobile device securely paired to the key fob and a remote server securely connected to the vehicle's telematics system. More specifically, by establishing the transmission path 115, the key fob 102, along with the wireless system 100, can maintain the intuitiveness and convenience of a typical key fob (e.g., as opposed to existing mobile app solutions), but also provide an extended communication range that, for example, is limited only by the reach of cellular, satellite, and/or wireless Ethernet networks.

In certain embodiments, the process descriptions or blocks in the figures, such as FIGS. 3 and 5, can represent modules, segments, or portions of code which include one or more executable instructions for implementing specific logical functions or steps in the process. Any alternate implementations are included within the scope of the embodiments described herein, in which functions may be executed out of order from that shown or discussed, including substantially concurrently or in reverse order, depending on the functionality involved, as would be understood by those having ordinary skill in the art.

It should be emphasized that the above-described embodiments, particularly, any "preferred" embodiments, are possible examples of implementations, merely set forth for a clear understanding of the principles of the invention. Many variations and modifications may be made to the above-described embodiment(s) without substantially departing from the spirit and principles of the techniques described herein. All such modifications are intended to be included herein within the scope of this disclosure and protected by the following claims.

The invention claimed is:

1. A vehicle key fob, comprising:
   a module for wirelessly communicating with an associated mobile device;
   a dedicated input device for initiating a mobile link mode;
   a plurality of input devices for commanding an associated vehicle to perform a user-selected function; and
   a processor configured to, upon receiving an input at the dedicated input device, send a command signal for performing the user-selected function to the mobile device.

2. The vehicle key fob of claim 1, further comprising at least one output device configured to provide a first output in response to receiving the input at the dedicated input device.

3. The vehicle key fob of claim 2, wherein the at least one output device is further configured to provide a second output in response to the processor sending the command signal to the mobile device.

4. The vehicle key fob of claim 2, wherein the at least one output device is further configured to provide a third output in response to the processor receiving a confirmation signal indicating completion of the user-selected function.

5. The vehicle key fob of claim 2, wherein the at least one output device includes a light emitting diode.

6. The vehicle key fob of claim 2, wherein the at least one output device includes a haptic device.

7. The vehicle key fob of claim 1, wherein the dedicated input device and the plurality of input devices are push buttons.

8. A wireless system, comprising:
a key fob configured to control a function of a vehicle upon receiving a first user input, the key fob including:
a plurality of input devices for receiving the first user input and
a dedicated input device for receiving a second user input to initiate a mobile link mode; and
a mobile device configured to;
receive, from the key fob, a first signal to initiate the mobile link mode;
when the mobile link mode is initiated, receive, from the key fob, a second signal commanding the vehicle to perform the function; and
send the second signal to a remote server in communication with the vehicle.

9. The wireless system of claim 8, wherein upon receiving a signal from the remote server, the vehicle performs the function and sends a confirmation signal to the remote server, the remote server sending the confirmation signal to the mobile device for relay back to the key fob.

10. The wireless system of claim 8, wherein the key fob further includes at least one output device configured to provide a first output in response to receiving the first user input and a second output in response to receiving the second user input.

11. The wireless system of claim 10, wherein the at least one output device includes a light emitting diode.

12. The wireless system of claim 10, wherein the at least one output device includes a haptic device.

13. The wireless system of claim 10, wherein the at least one output device is further configured to provide a third output upon receiving a confirmation signal indicating completion of the function.

14. The wireless system of claim 8, further comprising at least one of the vehicle and the remote server.

15. A method for extending a communication range of a key fob for a vehicle, comprising:
detecting, at the key fob, a first input on a dedicated input device for alerting a mobile device associated with the key fob;
subsequently detecting, at the key fob, a second input on one of a plurality of command buttons comprising a command to the vehicle to perform a function; and
in response to the subsequently detecting, sending the command to the mobile device for relay to the vehicle.

16. The method of claim 15, further comprising sending an await command signal to the mobile device upon detecting the first input.

17. The method of claim 15, further comprising:
providing a first output, via the key fob, to indicate detection of the first input; and
providing a second output, via the key fob, to indicate detection of the second input.

18. The method of claim 15, further comprising receiving a confirmation signal, from the mobile device, upon completion of the function by the vehicle.

19. The method of claim 18, further comprising providing a third output, via the key fob, to indicate receipt of the confirmation signal.

* * * * *